(12) United States Patent
Moussallam et al.

(10) Patent No.: US 8,326,963 B2
(45) Date of Patent: *Dec. 4, 2012

(54) SYSTEM AND METHOD FOR MIGRATING APPLICATIONS FROM A LEGACY SYSTEM

(75) Inventors: Fady Moussallam, Surfside, FL (US); Robert Evelyn, Miami, FL (US); Manuel de Anzizu, Miami, FL (US); William W. Wilson, III, Pinecrest, FL (US)

(73) Assignee: Progress Software Corporation, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/075,108

(22) Filed: Mar. 29, 2011

(65) Prior Publication Data
US 2011/0196954 A1    Aug. 11, 2011

Related U.S. Application Data

(63) Continuation of application No. 10/923,969, filed on Aug. 23, 2004, now Pat. No. 7,941,543.

(51) Int. Cl.
*G06F 15/173* (2006.01)
(52) U.S. Cl. ........ 709/223; 709/217; 709/225; 709/227; 709/229; 709/246; 707/999.01; 707/999.1
(58) Field of Classification Search .................. 709/217, 709/223, 225, 227, 229, 246; 707/999.01, 707/999.1
See application file for complete search history.

(56) References Cited

U.S. PATENT DOCUMENTS 7,941,543 B2 *   5/2011   Moussallam et al. ......... 709/227
2005/0256882 A1 * 11/2005   Able et al. ..................... 707/10

OTHER PUBLICATIONS

Chris Richardson, COBOL and Visual Basic on .NET: A Guide for the Reformed Mainframe Programmer, Feb. 2003, pp. 1-49.*

* cited by examiner

*Primary Examiner* — Yves Dalencourt
(74) *Attorney, Agent, or Firm* — Patent Law Works LLP

(57) ABSTRACT

An information processing system comprises a legacy application, a web services consumption copybook, and a set of application program interfaces for enabling the legacy application to access a selected web service via a web services consumption server. The web services consumption copybook represents data structures of the selected web service. The system can either connect to or include a set of web service proxies that each correspond to a web service available via a network connection. A web services consumption server is optionally used to route service requests from the application to the appropriate web service proxy. The system can also optionally include a developer tool for adapting legacy systems or environments to be able to consume web services using modern protocols thus allowing the migration of legacy subsystems to a networked loosely-coupled environment.

15 Claims, 3 Drawing Sheets

US 8,326,963 B2

SYSTEM AND METHOD FOR MIGRATING APPLICATIONS FROM A LEGACY SYSTEM

CROSS-REFERENCE TO RELATED APPLICATIONS

This application is a continuation of U.S. application Ser. No. 10/923,969 filed Aug. 23, 2004 and entitled "SYSTEM AND METHOD FOR MIGRATING APPLICATIONS FROM A LEGACY SYSTEM."

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of information processing systems and more particularly relates to the field of migration of software from mainframe environments to non-mainframe architectures and platforms.

BACKGROUND OF THE INVENTION

Business process control software was historically performed on mainframe platforms. The introduction of microprocessor-driven computing apparatus in the 1980s changed the world of computing and introduced a new paradigm for enterprise business process software that is not run on mainframes. However many enterprises have invested substantial sums of money on legacy mainframe software. There are typically 200-300 billion lines of application code consisting of millions of applications that currently reside on mainframe computers such as those provided by International Business Machines Corporation of Armonk, N.Y. These applications run the core business applications for approximately 6,000 companies and organizations, including most of the Global 1000. There is a need for a system and method to migrate these applications form a mainframe platform to non-mainframe platforms or architectures such as those running Windows operating systems.

SUMMARY OF THE INVENTION

Briefly according to an embodiment of the invention an information processing system comprises a legacy application, a web services consumption copybook, and a set of application program interfaces for enabling the legacy application to access a selected web service via a web services consumption server. The web services consumption copybook represents data structures of the selected web service. The system can either connect to or include a set of web service proxies that each correspond to a web service available via a network connection. A web services consumption server is optionally used to route service requests from the application to the appropriate web service proxy.

The system can also optionally include a developer tool for adapting legacy systems or environments to be able to consume web services using modern protocols thus allowing the migration of legacy subsystems to a networked loosely-coupled environment.

DETAILED DESCRIPTION

A system and method using the invention solve a critical issue facing global corporations as they evaluate strategies to move their business applications from legacy mainframe computing platforms to modern architectures and platforms and technologies such as those using client-server or distributed computing paradigms.

Figure 1:
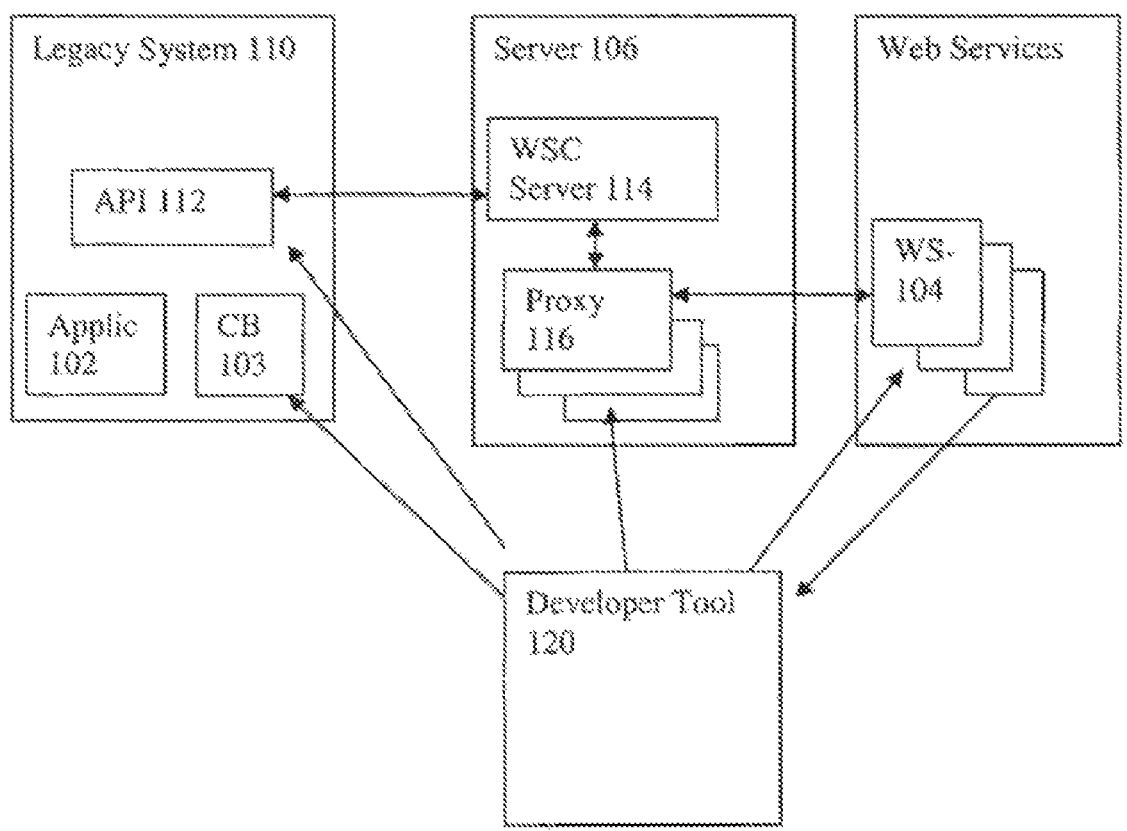
FIG. 1 is a block diagram depicting an architecture according to the invention.

Referring to FIG. 1, there is shown an information-processing system 100 according to an embodiment of the invention. The system 100 comprises a legacy system 110, a server 106, a set of web services 104 and a developer tool 120. The invention however can be used in a variety of configurations that generally enable systems that use the services of tightly coupled subsystems (legacy systems) to also use loosely coupled subsystems such as web services or other network services. The legacy applications include applications programs such as the COBOL (Common business Oriented Language) application program 102 that uses (i.e., consumes) services of legacy sub-systems. An example is an insurance system (application) that requests and receives services from a rating module or sub-system that is tightly coupled with the insurance system. According to an embodiment of the invention the application 102 can be adapted to use services of a web service provider 104 via a server 106 and the Internet 108 as opposed to the legacy subsystems hosted by the legacy system 110. This process, called sub-system migration, has many advantages that will be apparent to those skilled in the art. One such advantage is that the use of service resources available through a network such as the world-wide web (web services) eliminates the need for an enterprise using the system 110 to maintain applications (sub-systems) hosted in the system 110. Using the invention the application 102 can be a web service consuming application using the services provided by various software agents 104.

As used herein, a "legacy" program or application is one that cannot directly consume web services. In most cases the legacy system is a mainframe computer such as those provided by International Business Machines Corporation but in other cases it could be any system or architecture that is not able to consume Web Services or other loosely coupled services directly.

According to an embodiment of the invention, the mainframe computer 110 is adapted to enable the application 102 to consume web services 104 that use data types that are not specific to common encoding schemes. Thus, the mainframe computer 110 is adapted in part by installing a set of application program interfaces (APIs) 112 into it that enable the application 102 to request the selected web services via a server 106. The mainframe 110 uses these APIs 112 to direct requests or information to the web service consumption server software 114 hosted in the server 106. The mainframe computer 110 is further adapted to allow for the application 102 to consume web services 104 by modifying the application 102 and integrating a web services consumption copybook 103 into the web service consuming application 102. Alternatively, the copybook 103 can be stored in the system 110 so that the application 102 can interact with it without integration into the application 102. The copybook 103 represents the data structures of the web services inbound and outbound operation messages that the application 102 needs to consume. COBOL and other mainframe applications readily use copybooks. The application 102 requires a transformation process that converts web messages (e.g., using an XML-compatible messaging protocol) into data and instructions that can be used by the application 102. This transformation is delegated to an external web service proxy 116. We use the term "web services" to refer to services provided by a web-based application using a common messaging protocol such as SOAP (simple object access protocol), XML-RPC (extensible markup language-remote procedure call), or XMLP (XML protocol).

The server 106 preferably uses a microcomputer operating system with a graphical user interface such as Windows™ operating system provided by Microsoft Corporation or a UNIX operating system and comprises a Web service consumption (WsC) server software 114 and a Web services consumption proxy 116, conceptually disposed between the server 114 and the Web service source 104. The web services consumption proxy 116 is preferably a dynamic link library (DLL) that is used to communicate with the web service 104.

The system 100 addresses the business and technical requirements of systematically migrating these applications from the legacy mainframe computing platform to modern architectures and to integrate these systems into their service-oriented architecture (SOA) by allowing the legacy application 102 to consume web services 104 while a full migration to a web-services environment is completed. An SOA is an architecture that achieves loose coupling among interacting software agents. An example of a loose coupling is a set of computers that are linked to each other via a network and share each other's services.

The adaptation of the system 100 such that the application 102 consumes the web services 104 is preferably done at development time using a developer tool 120 that obtains information from the web services 104 and creates a copybook 103 for each service, a proxy 116 for the server 106, and the APIs 112 for the legacy system 110. The developer tool 120 includes in each proxy 116 web service access information such as the location of a particular web service.

Using the structure identified in the web services consumption copybook 103, the COBOL program 102 can consume a web service 104 using the APIs 112 to request the service and the web services consumption server 112 to select the appropriate web services consumption proxy 104. Then, the Server 114 channels the request through to the corresponding WsC proxy 116. The proxy 116 converts the request including associated data into an appropriate format and communicates with the Web service 104 to fulfill the request. Once the service 104 returns processed information or other service, the system 100 directs the processed information back to the calling mainframe program 110 for use by the application 102. The proxy 116 converts the information provided by the Web service 104 into a data format usable by the application 102 and sends that processed information using an appropriate transport mechanism or protocol.

Figure 2:
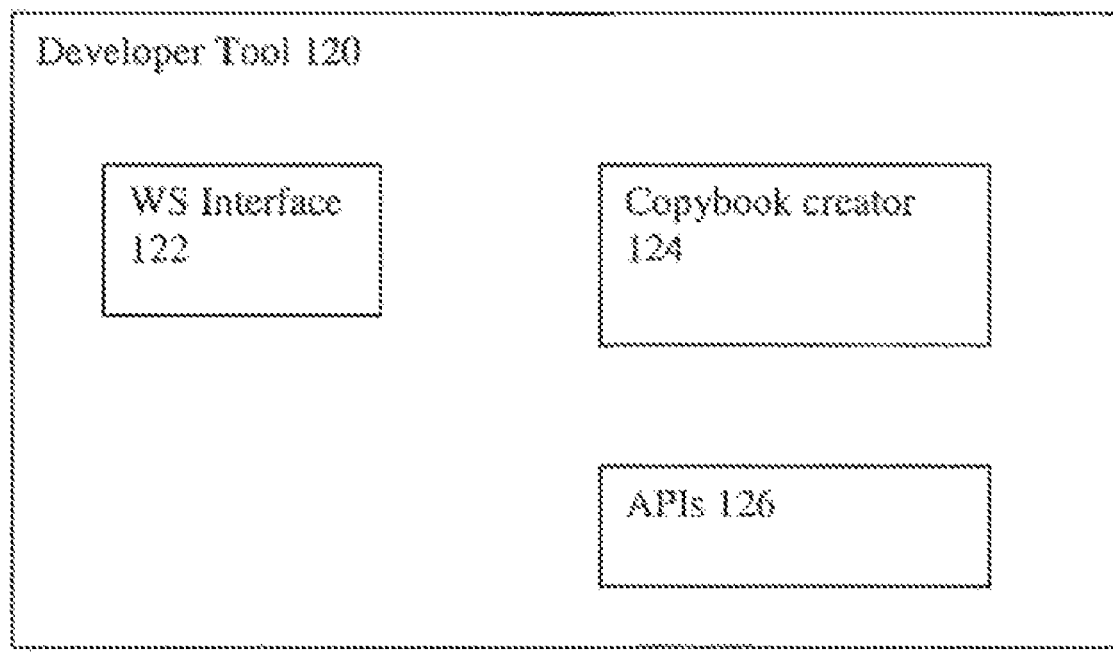
FIG. 2 is a block diagram depicting a computer readable medium comprising components according to an embodiment of the invention.

Referring to FIG. 2, the developer tool 120 can be implemented as a set of program instructions stored in a computer-readable medium such as a CD ROM or DVD or downloaded by users. The medium would include software for creating a web service interface 122, a copybook 124, and a set of APIs 126. The information stored in the medium includes both instructions and data. The instructions and data are preferably installed into a computer system that is preferably separate from the mainframe legacy system 110.

The program instructions in the medium are for seeking the information, from the various web services, that is required to create the components used to create the copybooks, APIs and proxies discussed herein. The set of APIs 126 comprises the APIs 112 for installation in the mainframe 110. The Web Service Consumption software 114 is used for loading into a server, for example using an operating system such as the Windows™ operating system or other suitable operating system, a set of proxies 116 (one for each Web service 104); and a set of copybooks for defining the variables (working storage) for each Web service to be integrated into a new or existing legacy program.

A sub-system is a group of business functions that tightly relate to each other. The sub-systems are rewritten on SOA architectures, one at a time. While this is happening, the WsC system 100 allows an enterprise to still run the backend application on the mainframe and consume Web services from a large number of platforms. Sub-systems are not isolated from one another. For the entire system to operate, sub-systems need to communicate with each-other. During the long transition period that our approach mandates, communication must flow inbound to the Legacy system and outbound from the Legacy system. Over time, the logic on the mainframe can be completely moved to another platform, once the code has been re-written and tested.

This type of migration can span several years, and provides a pragmatic way of migrating legacy applications to SOA. Migration costs can now be spread across multiple years and therefore high priority developments are not disrupted.

Figure 3:
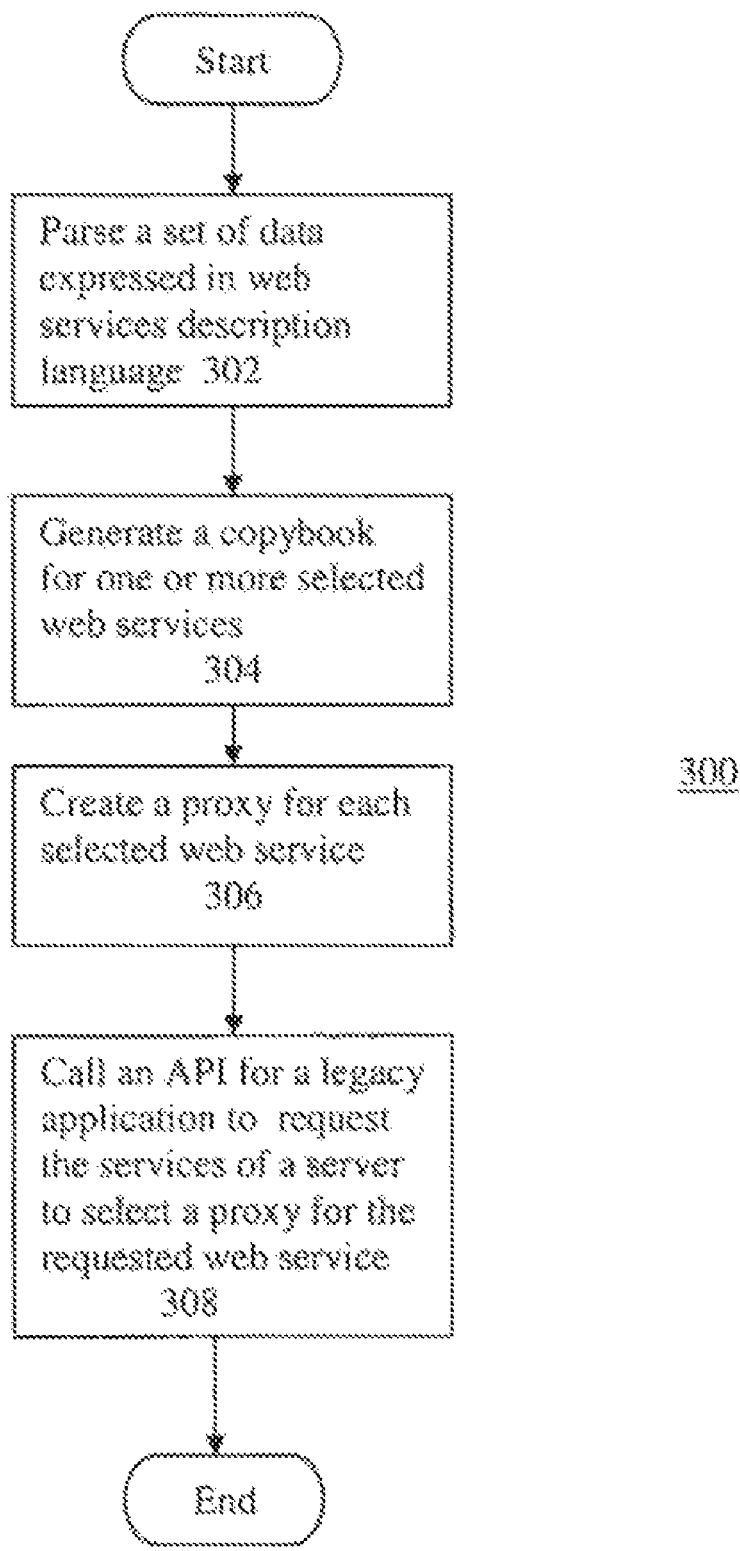
FIG. 3 is a flow chart illustrating a method according to the present invention.

Referring to FIG. 3, there is illustrated a method 300 according to an embodiment of the invention that involves using a subsystem migration approach. The method 300 is preferably performed with the developer tool 120. In step 302 the system parses a set of data expressed in a web services description language into a legacy structure. The data is associated with a request for processing by a selected web service.

In step 304, a copybook is generated for the selected web service. The copybook defines a set of variables for the selected web service so that the web service consuming application can use the requested web service.

In step 306 a proxy for handing the selected web service is created. In step 308 the copybook is installed into a legacy system.

In step 308 an application program interface (API) is called for use by the application to request the selected web service from a proxy for that web service. The API is preferably installed in the legacy system so that it can use the web services consumption server software to request the selected web service from a corresponding web services proxy.

What has been shown and discussed is a highly-simplified depiction of a programmable computer apparatus. Those skilled in the art will appreciate that other low-level components and connections are required in any practical application of a computer apparatus. Therefore, while there has been described what is presently considered to be the preferred embodiment, it will be understood by those skilled in the art that other modifications can be made within the spirit of the invention.

What is claimed is:

1. A non-transitory computer-readable storage medium for enabling a COBOL legacy system operable on a mainframe to consume web services, comprising:

a COBOL legacy application operable on the mainframe and stored on the storage medium;

a developer tool to parse a set of data associated with a request for a web service from a web message format into a legacy structure to enable the COBOL legacy application to request the web service, the set of data including web service access information describing a location of the web service;

a web services consumption copybook installed into the COBOL legacy application, the web services consumption copybook comprising a set of variables for the web service and representing data structures of inbound and outbound operation messages that are integrated into the COBOL legacy application so that the COBOL legacy application is adapted to use the web service; and a set of application programming interfaces installed on the mainframe and stored on the storage medium, the set of application programming interfaces for requesting the web service through a web service proxy for transforming communications between the COBOL legacy application and the web service based at least in part on the location of the web service.

2. The non-transitory computer-readable storage medium of claim 1 wherein the computer-readable storage medium is a component of a legacy mainframe computer.

3. The non-transitory computer-readable storage medium of claim 1 wherein the web service conforms to a service-oriented architecture.

4. The non-transitory computer-readable storage medium of claim 1 wherein the web service proxy comprises a dynamic link library.

5. The non-transitory computer-readable storage medium of claim 1, further comprising a web service consumption server for routing communications between the COBOL legacy application and the web service proxy.

6. The non-transitory computer-readable storage medium of claim 1, wherein the web service is a simple object access protocol web service.

7. A computer-implemented method for enabling a COBOL legacy system operable on a mainframe to consume web services, comprising:

parsing on the mainframe a set of data associated with a request for a web service from a web message format into a legacy structure to enable a COBOL legacy application operable on the mainframe to request the web service, the set of data including web service access information describing a location of the service;

generating a web services consumption copybook installed into the COBOL legacy application and comprising a set of variables for the web service and representing data structures of inbound and outbound operation messages that are integrated into the COBOL legacy application so that the COBOL legacy application is adapted to use the web service;

creating an application programming interface installed on the mainframe to request the web service through a web service proxy; and calling the web service proxy to transform communications between the COBOL legacy application and the web service based at least in part on the location of the web service.

8. The computer-implemented method of claim 7 wherein the web service proxy is a dynamic link library.

9. The computer-implemented method of claim 7 further comprising communicating with a web service consumption server to route communications between the COBOL legacy application and the web service proxy.

10. The computer-implemented method of claim 9 wherein the web service proxy is installed in the web service consumption server.

11. A non-transitory computer-readable storage medium for linking a COBOL legacy application operable on a mainframe to a web service requested by the COBOL legacy application, comprising:

a web services consumption copybook installed into the COBOL legacy application, the web services consumption copybook comprising a set of variables for the web service and representing data structures of inbound and outbound operation messages that are integrated into the COBOL legacy application so that the COBOL legacy application is adapted to use the web service;

a web service proxy stored on the storage medium, the web service proxy for transforming communications between the COBOL legacy application and the web service based a leas in part on a set of data including web service access information describing a location of the web service; and a web service consumption server stored on the storage medium, the web service consumption server for routing data between the COBOL legacy application and the web service by routing data through the web service proxy.

12. The non-transitory computer-readable storage medium of claim 11 further comprising a set of application programming interfaces for enabling the COBOL legacy application to request the web service from the web service proxy.

13. The non-transitory computer-readable storage medium of claim 11 wherein the web service proxy is a dynamic link library.

14. A non-transitory computer-readable storage medium storing computer executable program code for enabling a COBOL legacy system operable on a mainframe to consume web services, the computer-executable code comprising:

a developer tool for parsing a set of data associated with a request for a web service from a web message format into a legacy structure to enable a COBOL legacy application operable on the mainframe to request the web service, the set of data including web service access information describing a location of the we service;

a copybook module installed into the COBOL legacy application, the copybook module comprising a set of variables for the web service and representing data structures of inbound and outbound operation messages that are integrated into the COBOL legacy application so that the COBOL legacy application is adapted to use the web service;

a web service proxy to transform communications between the COBOL legacy application and the web service based at least in part on the location of the web service and a communications module for calling an application programming interface installed and stored on the mainframe to request the web service through the web service proxy.

15. The non-transitory computer-readable storage medium of claim 14, wherein the web service proxy is a dynamic link library.

* * * * *